(12) United States Patent
Ohkita et al.

(10) Patent No.: US 6,188,541 B1
(45) Date of Patent: Feb. 13, 2001

(54) MAGNETIC RECORDING-REPRODUCING DEVICE

(75) Inventors: Masao Ohkita; Mikio Oka; Katsunari Sonoda, all of Miyagi-ken (JP)

(73) Assignee: Alps Electric Co., Ltd., Tokyo (JP)

(*) Notice: Under 35 U.S.C. 154(b), the term of this patent shall be extended for 0 days.

(21) Appl. No.: 09/235,726

(22) Filed: Jan. 22, 1999

(30) Foreign Application Priority Data

Jan. 28, 1998 (JP) .................................................. 10-015824

(51) Int. Cl.[7] ................................................. G11B 15/675
(52) U.S. Cl. ............................................................. 360/96.5
(58) Field of Search ................................... 360/96.5, 96.6

(56) References Cited

U.S. PATENT DOCUMENTS 5,371,639    12/1994    Bryer ................................... 360/96.5
5,434,727 *  7/1995    Kage et al. .......................... 360/96.5
5,440,435    8/1995    Busengdal et al. .................. 360/96.5

* cited by examiner

*Primary Examiner*—Robert S. Tupper
(74) *Attorney, Agent, or Firm*—Brinks Hofer Gilson & Lione

(57) ABSTRACT

Disclosed is a magnetic recording-reproducing device in which an engagement portion of a cartridge is locked by a locking portion of a first slide member; therefore as first and second slide members and slide, the cartridge also slides to be loaded and unloaded. The loading and unloading of the cartridge, therefore, can easily be accomplished with extremely little force.

5 Claims, 10 Drawing Sheets

MAGNETIC RECORDING-REPRODUCING DEVICE

BACKGROUND OF THE INVENTION

1. Field of the Invention

The present invention relates to a magnetic recording-reproducing device, and more particularly, to a tape cartridge mounting mechanism for reliable mounting of a cartridge in which a magnetic tape is contained.

2. Description of Related Art

A conventional magnetic recording-producing device will be explained with reference to FIG. 16 giving a plan view of the device, FIG. 17A which is a sectional view taken along line A—A of FIG. 16, and FIG. 17B which is a side view showing a major portion of FIG. 17A.

First, in a conventional magnetic recording-reproducing device 21 (hereinafter referred to as the device 21), a pair of rail-like guide members 21b and 21c having a channel-shaped groove are mounted in opposite positions, upper and lower in the illustration, adjacently to the right side end shown in FIG. 16, on a base plate 21a disposed in the lower part.

Next, as shown in FIG. 17A, a pair of openings 21d are formed in a part of the base plate 21a in a portion in which the pair of guide members 21b and 21c are located.

In the right side end portion of the magnetic recording-reproducing device shown in FIG. 17A there is formed an insertion slot 21e for guiding a bottom plate 23c of a later-described cartridge 23 and inserting the cartridge 23 into the magnetic recording-reproducing device shown in FIG. 17A.

On the back face provided with the guide members 21b and 21c of the base plate 21a, a pair of leaf springs 22 having a great elastic force are mounted with one end fastened with a screw and the other end left as a free end. On the forward end of the free end of the leaf spring 22, a locking portion 22a is formed bent and a locking roller 22b is rotatably supported in the locking portion 22a.

The locking roller 22b is positioned in the opening 21d of the base plate 21a and is vertically movable on the support point of the screwed portion on one end within the opening 21d.

The cartridge 3 indicated by a two-dot chain line in the illustration is inserted at the insertion slot 21e into the device 21 while being guided by the guide members 21a and 21b. In the cartridge 23 is housed a magnetic tape 23a; and a pair of U-shaped guide grooves 23b are formed in both outer surfaces as seen in FIG. 17B. The pair of guide grooves 23b are guided by the rail-like guide members 21b and 21c, thus guiding the cartridge 23 into the device 21.

A cut away portion 23d is formed in a part of the bottom plate 23c which constitutes the guide groove 23b of the cartridge 23. Also in the cartridge 23a rotatable pinch roller 23f is disposed to transport the magnetic tape 23a laterally by means of a tape feed belt 23g.

Furthermore a magnetic head 24 and a tape transport roller 25 are disposed within the device 21.

The loading operation for loading the cartridge 23 in the device 21 is done as follows: first the forward end of the cartridge 23 is manually inserted in the direction of the arrow D into the insertion slot 21e of the device 21.

The forward end of the bottom plate 23c of the cartridge 23 hits against the locking roller 22b of the leaf spring 22.

As the cartridge 23 is further pressed inwardly with a greater force from this position into the device 21, the locking roller 22b is pushed downwardly by the bottom plate 12c of the cartridge 23, deflecting the leaf spring 22 downwardly until the locking roller 22b comes into elastic contact with the underside of the bottom plate 23c.

Then, as the cartridge 23 is pushed further into the device 21, the roller 22b that has been pushed downwardly to the underside of the bottom plate 23c comes in the cut away portion 23d of the cartridge 23, thus being moved upwardly into the cut away portion 23d with a great elastic force of the leaf spring 22. Then, as shown in FIG. 17A, the locking roller 22b makes elastic contact with one end of the cut away portion 23d, and the one end of the cut away portion 23d is pressed obliquely upwardly of the direction of the arrow C by the locking roller 22b, moving the cartridge 23 into contact with a stopper (not illustrated) in the device 21. The cartridge 23 is thus stopped to be loaded within the device 21.

At this time, the pinch roller 23f of the cartridge 23 is pressed into contact with the tape transport roller 25 in the device 21, so that the cartridge 23 will not further enter the device 21.

The pinch roller 23f is pressed in contact with the tape transport roller 25; in this state when the tape transport roller 25 is rotated, the pinch roller 23f also rotates, to thereby transport the magnetic tape 23a laterally via the tape feed belt 23g in the cartridge 23.

With the cartridge loaded in the device 21, the tape transport roller 25 is rotated by an instruction from an external computer not shown, thereby enabling recording a specific information in the magnetic tape 23a by means of the magnetic head 24 or reproducing the information from the magnetic tape 23a.

To eject the cartridge 23 out from the device 21, the rear end portion 23e of the cartridge 23 which protrudes out of the device 21 shown in FIG. 16 is manually pulled in the direction of the arrow E, and the locking roller 22b goes away downwardly from the cut away portion 23d of the cartridge 23, allowing the unloading of the cartridge 23 out of the device 21.

In the above-described conventional device 21, however, the loading and unloading of the cartridge are manually performed. Therefore, a considerable force (about 1.5 kgf to 3 kgf) is required for cartridge loading and unloading because of the presence of a great elastic force of the leaf spring 22. It is, therefore, difficult for a physically weak person to load and remove the cartridge 23.

If the cartridge 23 is forced recklessly into the device 21, the front side of the cartridge hits against a stopper (not illustrated) in the device 21, damaging both the cartridge and the stopper.

If the elastic force of the leaf spring 22 is reduced in an attempt to facilitate the loading and unloading of the cartridge 23, the force of the leaf spring for holding the cartridge 23 when the cartridge 23 is inserted into the device 21 will decrease, resulting in slipping of the pinch roller 23f in pressure contact with the tape transport roller 25, unstable feed of the magnetic tape 23a, and a failure of proper recording and reproducing.

SUMMARY OF THE INVENTION

A magnetic recording-reproducing device, as a first means to solve the above-described problem, is comprised of a cartridge provided with an engagement portion and containing a magnetic tape therein, a first slide member having a locking portion for locking the engagement portion, a second slide member connected with the first slide member, for sliding the first slide member, and a housing for slidably holding the first and second slide members separately; the engagement portion of the cartridge being locked by the locking portion of the first slide member, and the cartridge being slid for loading and unloading by means of the first and second slide members.

As a second means for solving the above-described problem, the housing is provided with a bottom plate having a window, and the locking portion of the first slide member is slidably arranged on the window and on the bottom plate, so that when the locking portion is positioned at the window, the locking portion is moved up or down in the window during cartridge loading in, or unloading from, the first slide member to thereby engage or release the engagement portion of the cartridge by the locking portion.

As a third means for solving the above-described problem, the locking portion is placed in the engagement portion in the position of the window to lock the cartridge, and in this state the first slide member is slid to move the locking portion from the window onto the bottom plate, thus restricting the downward movement of the locking portion to hold the cartridge in the locked state.

A link member for connecting the first and second slide members is provided as a fourth means to solve the above-described problem. One end of the link member is connected with the first slide member while the other end is connected with the second slide member. At the same time, the link member is rotatably supported by a pivot between its one end and the other end on the bottom plate of the housing. When the second slide member is slid, the first slide member slides in the opposite direction of sliding of the second slide member through the link member.

As the fifth means for solving the above-described problem, the second slide member comprises the first member and the second member, between which an elastic member is mounted. The link member is connected at the other end with the first member. When the second member is slid, the first member slides in the same direction as the second member through the elastic member mentioned above. Therefore the first slide member connected with the one end of the link member slides in the opposite direction of sliding of the second slide member through the link member.

As a sixth means for solving the above-described problem, the magnetic recording-reproducing device is comprised of a tape transport roller rotatably supported on the housing, and a rotatable pinch roller in the cartridge. After the mounting of the cartridge is completed, the second member of the second slide member is further slid to transmit the elastic force of the elastic member to the first slide member through the first member and the link member to thereby press the pinch roller into contact with the tape transport roller.

Furthermore, the magnetic recording-reproducing device, as a seventh means to solve the above-described problem, is comprised of a cartridge provided with an engagement portion and housing the magnetic tape, an openable-closable cartridge door provided on the front side of the cartridge, a first slide member having a locking portion to lock the engagement portion of the cartridge, a cartridge door opening-closing portion provided on the first slide member, a second slide member connected with the first slide member for sliding the first slide member, a driving power source for sliding the second slide member, and a housing for slidably holding the first and second slide members separately; when the cartridge is mounted on the first slide member, the cartridge door is opened by the opening-closing portion of the first slide member.

Furthermore, simultaneously with the opening operation of the cartridge door, or after the opening of the cartridge door, the locking portion of the first slide member is positioned in the engagement portion of the cartridge to thereby lock the cartridge.

DESCRIPTION OF THE PREFERRED EMBODIMENTS

Figure 1:
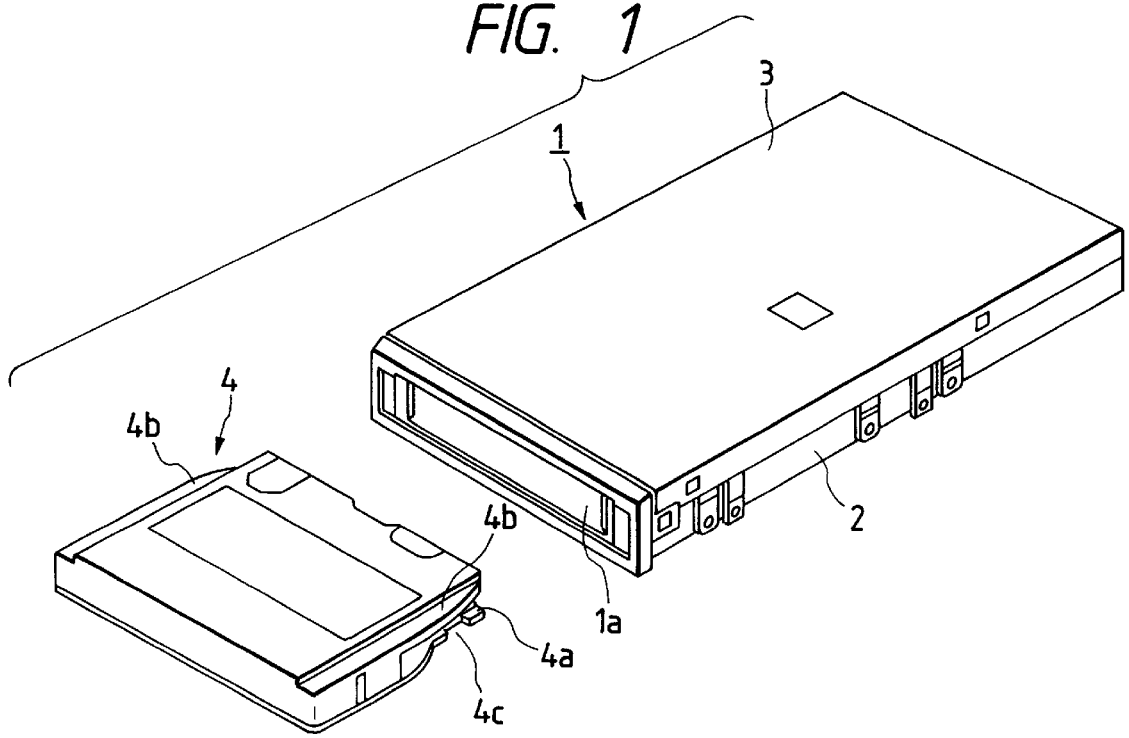
FIG. 1 is a schematic perspective view of a magnetic recording-reproducing device of the present invention and a cartridge.

One embodiment of a magnetic recording-reproducing device according to the present invention will be described with reference to FIG. 1 to FIG. 15. First, the magnetic recording-reproducing device 1 (hereinafter referred to as the device 1) of the present invention, as shown in perspective in FIG. 1 and FIG. 2, is schematically constituted of a housing 2 which is approximately rectangular in outside shape and attached with various kinds of later-described components inside, a door 3 for opening and closing the upper part of the housing 2, and a cartridge insertion slot 1a formed in the front side of the housing 2.

A cartridge 4 loaded in the device 1 contains a magnetic tape inside, and has upper and lower guide portions 4a and 4b formed on both outer sides for guiding the cartridge 4 into the device 1, and a cut away engagement portion 4c in the lower guide portion 4a.

Figure 2:
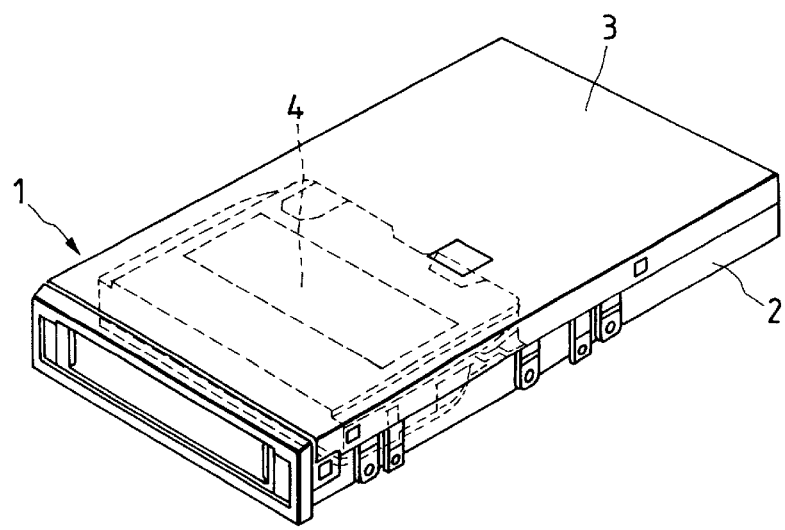
FIG. 2 is a schematic perspective view showing the magnetic recording-reproducing device of the present invention loaded with the cartridge.

FIG. 2 is an external view showing the cartridge 4 loaded in the device 1; in the device 1 the whole body of the cartridge 4 has been inserted.

Figure 3:
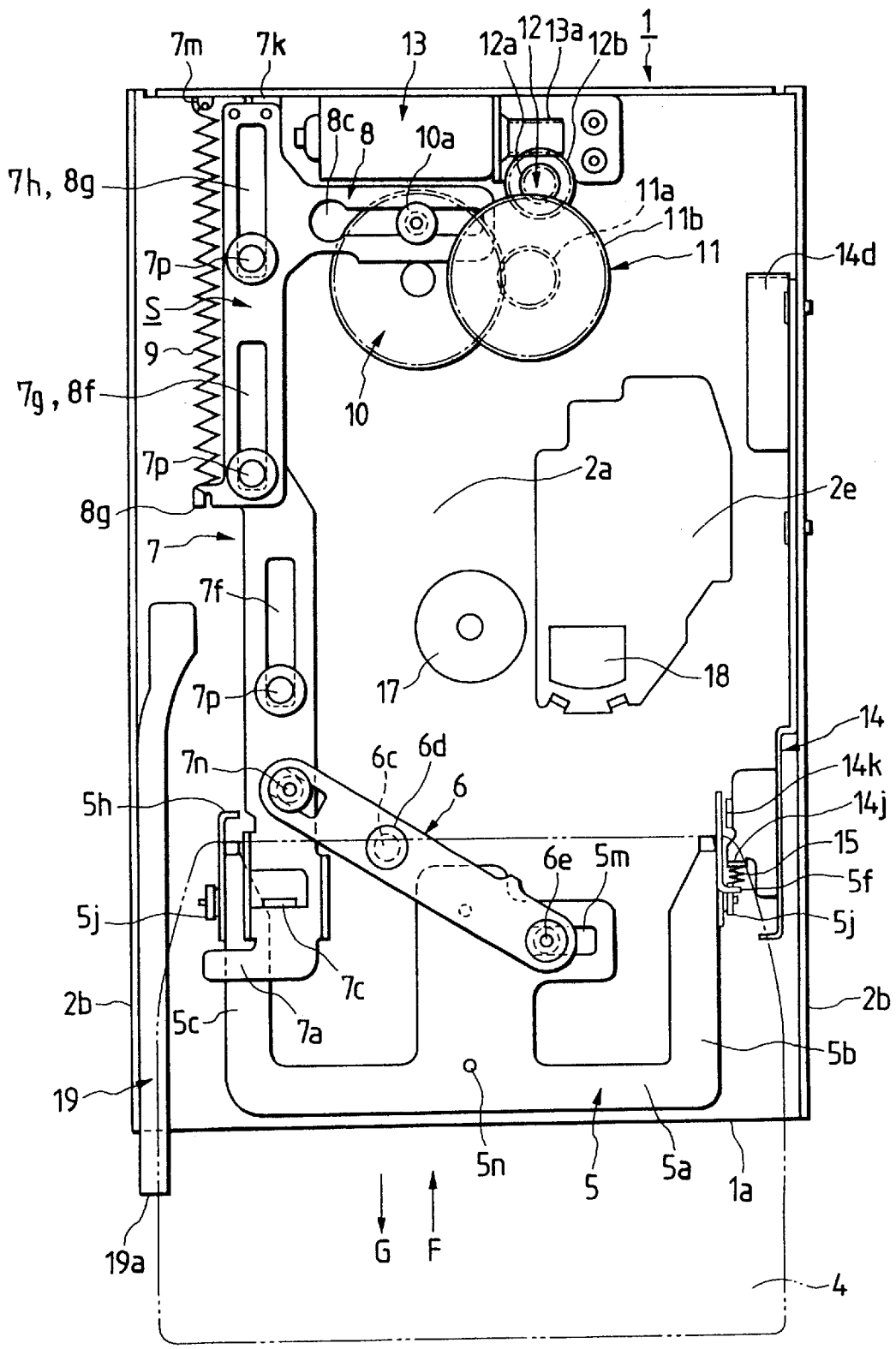
FIG. 3 is a schematic top view for explaining the interior of a housing of the magnetic recording-reproducing device of the present invention.

The aforesaid constitution of the device 1 will be described in detail with reference to FIG. 3 to FIG. 16. FIG. 3 is a top view in perspective showing the interior of the housing 2 with the door 3 of the device 1 removed.

The device 1 of the present invention is provided with housing 2 in which a plurality of different kinds of components are contained. The housing 2, as shown in the top view of FIG. 4 and in the front view of FIG. 5, is formed rectangular in outside shape by blanking and bending a metal sheet by a press working.

In the housing 2 an approximately flat bottom plate 2a is formed at the bottom, on the left in the illustration of the bottom plate 2a a pair of side plates 2b, 2b are bent up in opposite positions.

Figure 4:
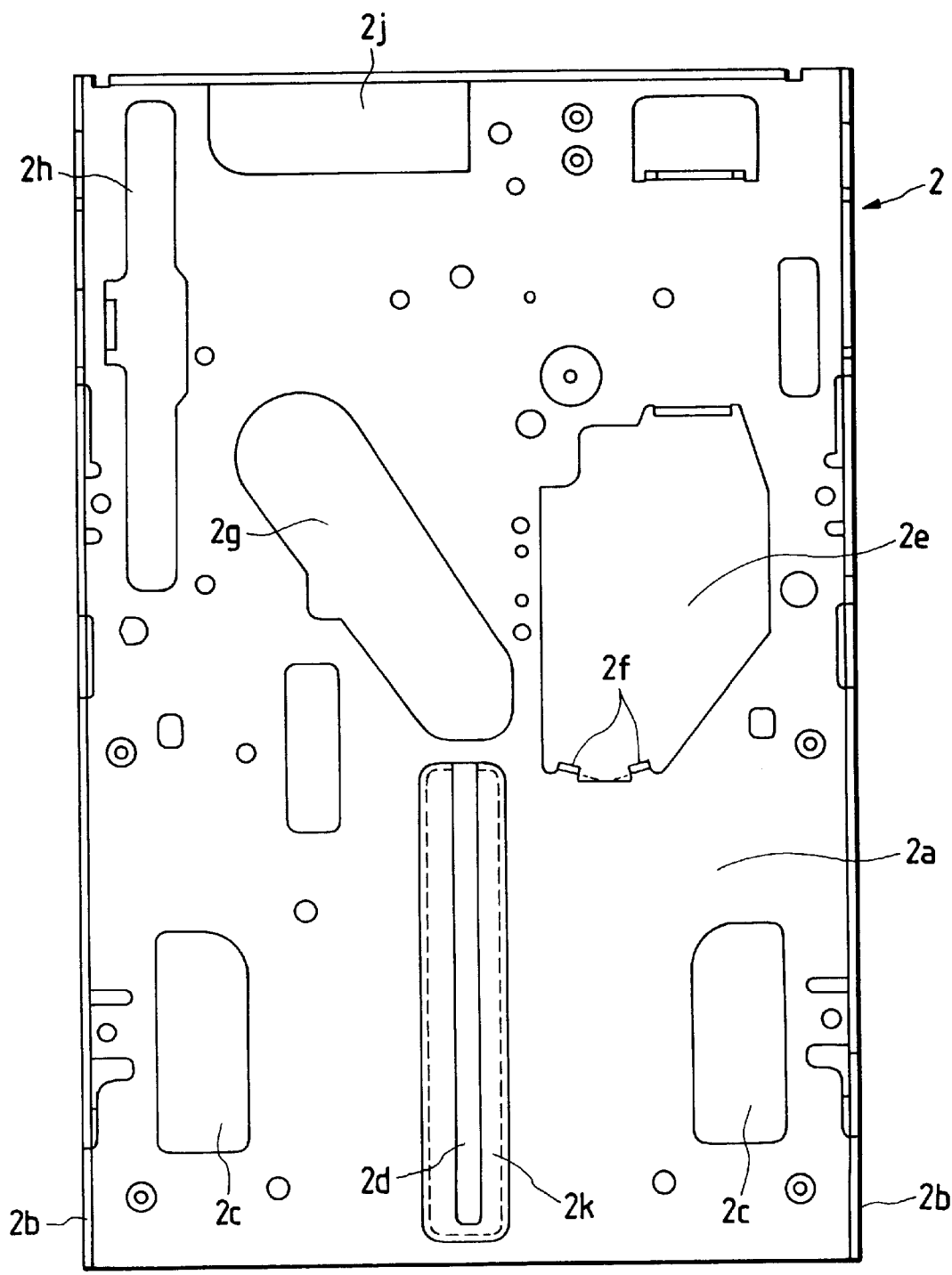
FIG. 4 is a top view of the housing of the magnetic recording-reproducing device of the present invention.
Figure 5:
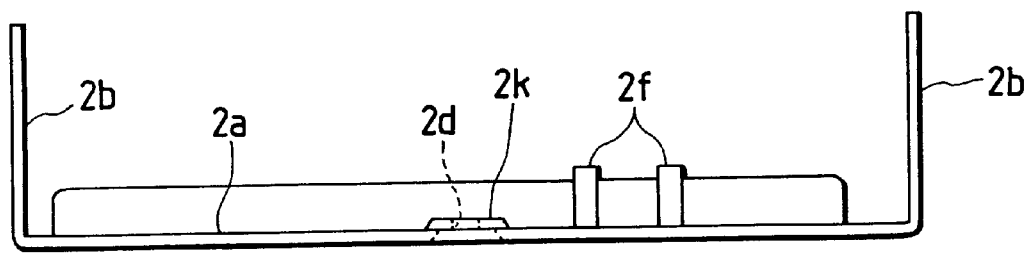
FIG. 5 is a front view of the housing of the magnetic recording-reproducing device of the present invention.

In the places, right and left, of the bottom plate 2a in the lower part in FIG. 4, a pair of approximately rectangular windows 2c, 2c are formed by blanking by a press. Nearly at the center between the pair of windows 2c, 2c a longitudinally extending long hole 2d is formed by punching vertically in the illustration.

Around the long hole 2d is a protuberant portion 2k formed by pressing outwardly from the back side of the bottom plate 2a.

Furthermore, in the right upper part of the drawing, above the long hole 2d, an approximately rectangular head mounting hole 2e is formed by punching; and on the inside surface of the head mounting hole 2e in the lower part of the drawing, two stoppers 2f are provided by slitting and bending up.

Furthermore, an approximately oblong roller mounting hole 2g is formed above the long hole 2d, extending obliquely upwardly to the left. On the left in the illustration of the roller mounting hole 2g, in the vicinity of the left side plate 2b, a longitudinally long opening 2h is formed by punching.

Furthermore, in the illustration, in the left upper end part, an approximately rectangular motor mounting hole 2j is formed to allow sliding a later-described cartridge 4 into, or discharging the cartridge 4 out from, the device 1. In the vicinity of this motor mounting hole 2j a plurality of small-diameter round holes are formed by punching.

Figure 6:
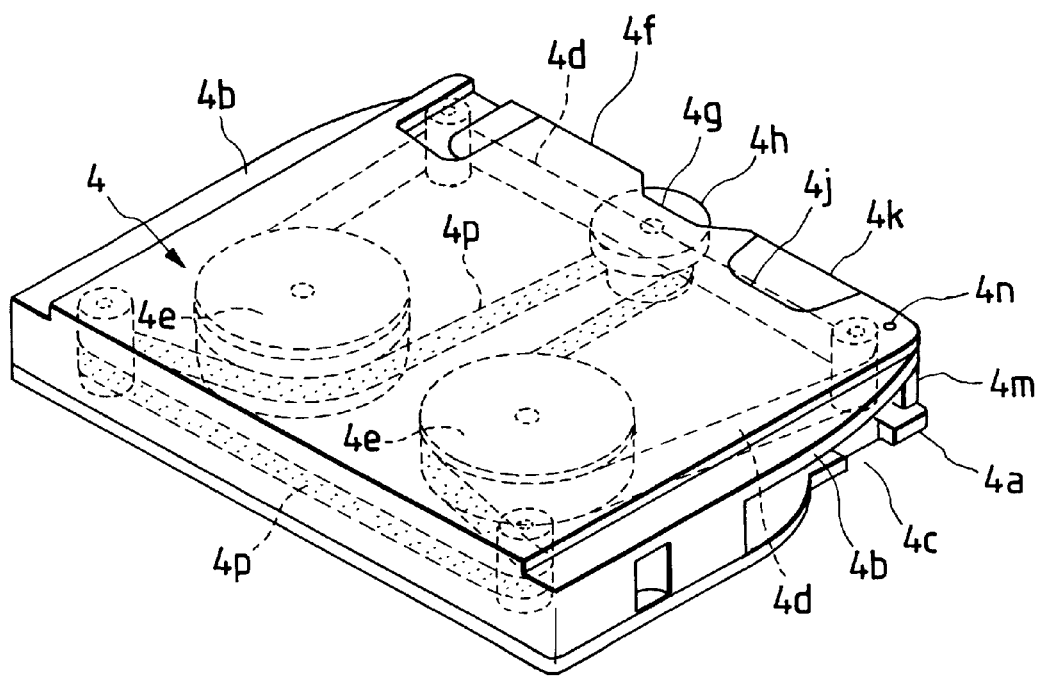
FIG. 6 is a perspective view of a cartridge to be used in the magnetic recording-reproducing device of the present invention.

The cartridge 4 loaded in the device 1 is formed externally in a shape of box. As illustrated in FIG. 6, two guide portions 4a and 4b are formed, outwardly protruding like rails, on both the right upper and lower sides and left upper and lower sides. Also, in the lower guide portion 4a is formed a cut away engagement portion 4c.

In the cartridge 4 a magnetic tape 4d is housed. The magnetic tape 4d is wound at both ends on rotatable reels 4e, 4e.

In the central part of the front side 4f of the cartridge 4 a cut away portion 4g is formed. A rotatable pinch roller 4h is disposed with a part of its outer peripheral portion sticking out from this cut away portion 4g. In synchronization of the rotation of this pinch roller 4h the reels 4e, 4e rotate clockwise or counterclockwise through a tape feed belt 4p, thus allowing the winding and unwinding of the magnetic tape 4d on the reels 4e, 4e.

On the right side of the cut away portion 4g of the cartridge 4 there is formed an opening 4j where the magnetic tape 4d is exposed on the front side 4f and slides on a later-described magnetic head 18. In the opening 4j a door 4k which can be opened and closed is disposed.

The door 4k is provided with an end portion 4m formed on the right-hand side in the illustration. The end portion 4m is supported by a support pin 4n, on which the door 4j is rotatable.

The support pin 4n is wound with a torsion coil spring (not illustrated). When the device 1 is not loaded with the cartridge 4, the door 4k constantly covers the opening 4j to prevent entry of dirts into the cartridge 4.

Also, as shown in FIG. 3, a first slide member 5 is disposed on the bottom plate 2a of the housing 2 so that, when the cartridge 4 is inserted into the housing 2, the cartridge 4 is locked and slides into the device 1.

Figure 7:
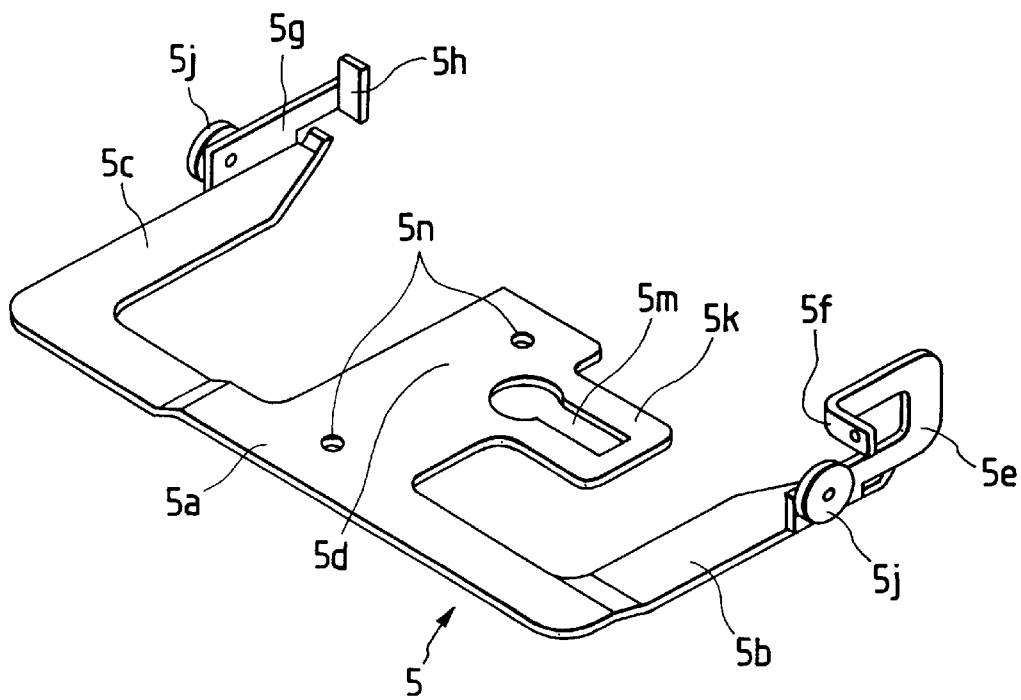
FIG. 7 is a perspective view of a first slide member of the magnetic recording-reproducing device of the present invention.

The first slide member 5 is produced of a resilient metal (e.g., stainless steel) sheet, and has, as shown in perspective in FIG. 7, a base portion 5a on the front side in the illustration, arms 5b and 5c on both the right and left sides of the base portion 5a, and a flat-shaped link support portion 5d at center, thus being built approximately E-type in outside shape.

An approximately U-shaped roller holding section 5e is formed bent upwardly near the forward end of the arm 5b on the right side in the illustration. The upper front end of the roller holding section 5e is bent at right angle outwardly, forming an opening-closing portion 5f. The opening-closing portion 5f is of such a design that when the cartridge 4 is inserted into the device 1, the opening-closing portion 5f contacts the end 4m of the door 4k of the cartridge 4, to thereby turn the door 4k to open towards the front side of the cartridge 4.

Also near the forward end of the arm 5c on the left side in the illustration of the base portion 5a there is provided a roller holding section 5g which is bent upwardly. The roller holding section 5g is disposed oppositely to the roller holding section 5e on the right side in the illustration.

The forward end of this roller holding section 5g is bent at right angle inwardly to form the stopper portion 5h. The stopper portion 5h is designed such that when the cartridge 4 is mounted to the first slide member 5, the front side 4f of the cartridge 4 contacts the stopper portion 5h so that the cartridge 4 can not be pushed in further over the stopper portion 5h.

On the outer side of the roller holding sections 5e and 5g, a pair of locking portions 5j, 5j either consisting of a locking roller are pivotally mounted in opposite positions.

Furthermore, a projecting portion 5k projecting towards the arm 5b on the right in the illustration is formed near the forward end of the link support portion 5d. The projecting portion 5k is provided with an approximately keyhole-shaped link mounting slot 5m punched rectangular at one end and circular at the other end.

The link support portion 5d is provided with a couple of mounting holes 5n for slidably mounting the first slide member 51 to the long hole 2d of the housing 2.

The first slide member 5 thus designed is slidably mounted on the bottom plate 2a of the housing 2, so that the locking portions 5j, 5j are slidable on the windows 2c, 2c and the bottom plate 2a.

Figure 8A:
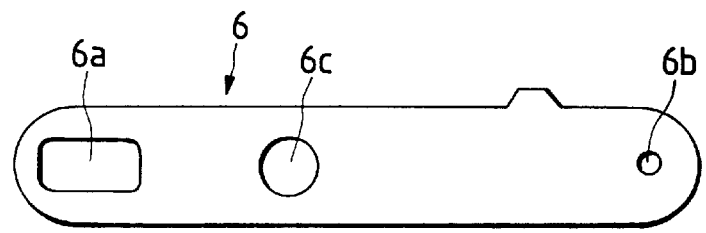
FIGS. 8A and 8B are respectively a plan view and a sectional side view of a link member of the magnetic recording-reproducing device of the present invention.
Figure 8B:
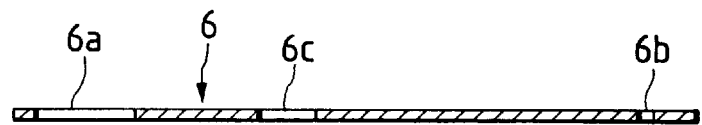

Furthermore, as shown in FIG. 3, one end of the link member 6 is slidably pivoted and connected with the link mounting slot 5m of the first slide member 5. The link member 6, as shown in FIGS. 8A and 8B, is provided with an approximately rectangular opening 6a in the other end on the left side in the illustration, a round hole 6b in one end on the right side in the illustration, and a support hole 6c in a position a little adjacent to the opening 6a between the one end and the other end; these hole and openings are formed by punching by a press.

The link member 6, as illustrated in FIG. 3, is rotatably attached by inserting, into a support hole 6c, a support pin 6d pivotally supported by caulking on the bottom plate 2a of the housing 2. The link member 6 is designed to rock on the support point of the support pin 6d with its one end and the other end turning in opposite directions.

In the round hole 6b in one end of the link member 6 a guide pin 6e is pivoted, so that the guide pin 6e will be positioned in the link mounting slot 5m of the first slide member 5. As the link member 6 rotates on the support pin 6d, the guide pin 6e moves within the link mounting slot 5m, thus sliding the first slide member 5 shown in FIG. 3 in the directions of the arrows F and G.

In the opening 6a in the other end of the link member 6, a second slide member S as illustrated in FIG. 3 is slidably pivoted on the bottom plate 2a of the housing 2. The second slide member S is comprised of two members: a first member 7 and a second member 8 disposed above the first member 7. Either of the first and second members 7 and 8 has been formed by bending a metal sheet by a press working.

Figure 9:
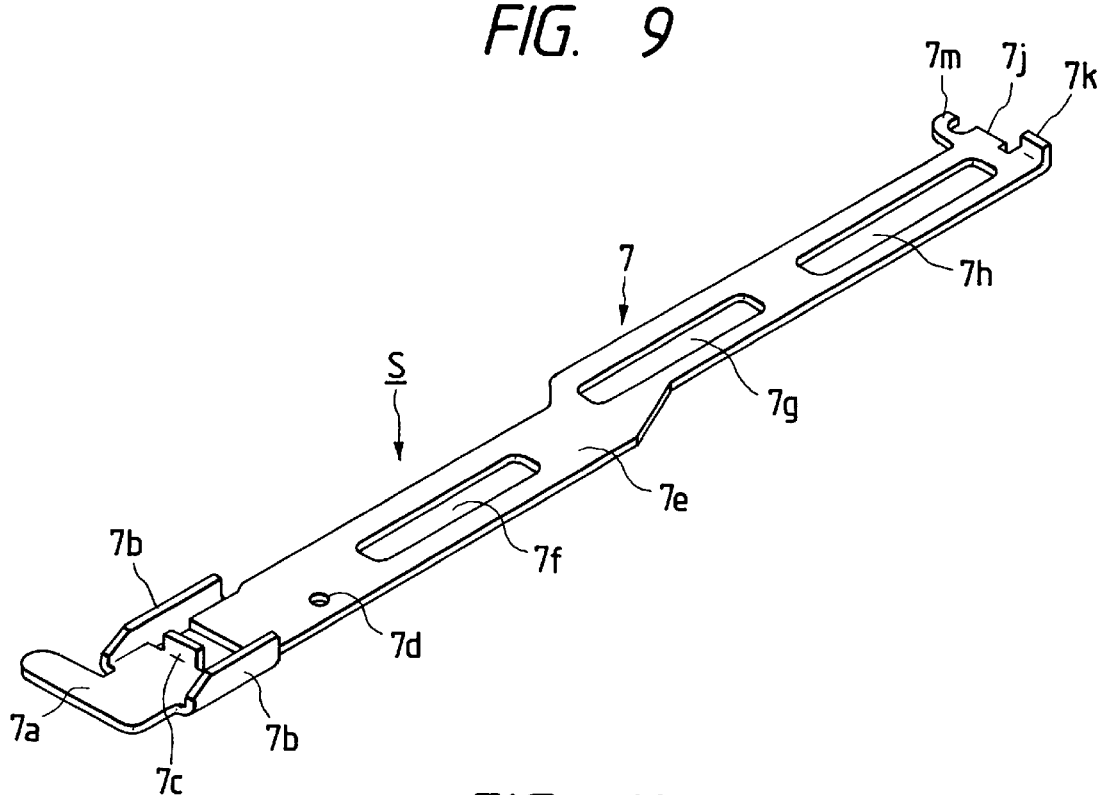
FIG. 9 is a perspective view of a first member of a second slide member of the magnetic recording-reproducing device of the present invention.

The first member 7, as shown in perspective in FIG. 9, is formed approximately L-shape at the forward end portion 7a on the front side in the illustration; and both the right and left sides near the forward end portion 7a make two guides 7b, 7b bent upwardly in opposite positions.

A flat portion between these two guides 7b, 7b is partly cut and bent upwardly in the illustration to form a pressing member 7c.

To the rear of the guides 7b, 7b in the illustration mounting hole 7d of a specific hole diameter is formed; and behind the mounting hole 7d in the illustration a flat section 7e is formed.

Furthermore, a mounting hole 7f is formed in the front part of the flat section 7e and two mounting holes 7g and 7h in the rear part of the flat section 7e, by punching all longitudinally at a specific width in the illustration.

The two mounting holes 7g and 7h in the rear part thus formed are shifted slightly to the left in the illustration with respect to the mounting hole 7f in the front part.

Furthermore, at the rear end 7j in the rear part of the first member 7 in the illustration a stopper 7k is formed by bending the right side upwardly in the illustration; and on the left side of the rear end 7j in the illustration there is formed a spring retaining portion 7m protruding from the flat section 7e to form a recess.

In the first member 7 of the above-described constitution, a support pin 7n is attached by caulking to the mounting hold 7d as shown in FIG. 3. The support pin 7n has been supported in the opening 6a of the link member 6. The other end of the link member 6 is retained by a retaining ring (not illustrated) and slidably pivoted on the first member 7 of the second slide member S.

When the first member 7 slides in the direction of the arrow F or the arrow G shown in FIG. 3, the support pin 7n attached on the second member 7 slides within the opening 6a of the link member 6 to thereby rotate the link member 6.

Also in the first member 7 three lock pins 7p secured by caulking on the bottom plate 2a of the housing 2 shown in FIG. 3 are inserted and pivoted in the three mounting holes 7f, 7g and 7h respectively, so that the first member 7 can slide vertically on the bottom plate 2a in the illustration.

Figure 10:
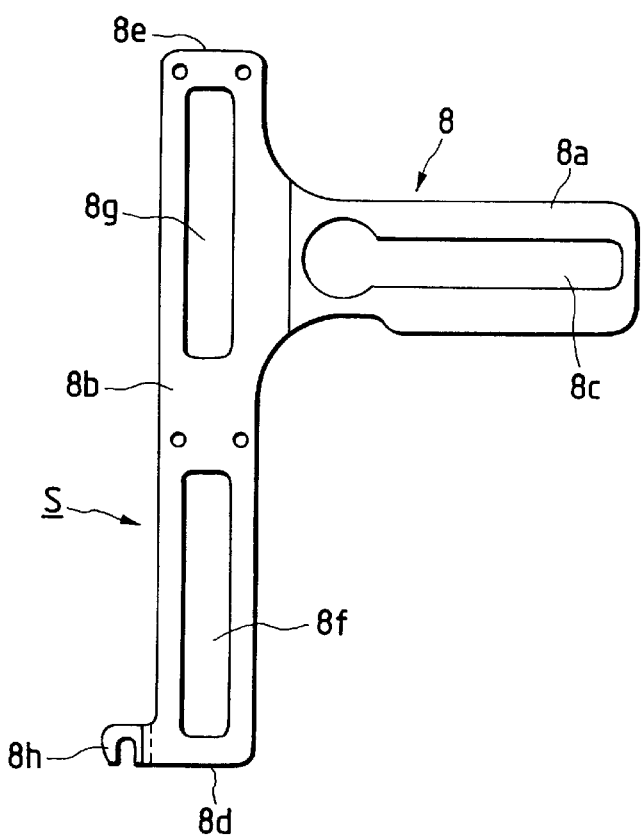
FIG. 10 is a plan view of a second member of the second slide member of the magnetic recording-reproducing device of the present invention.

Furthermore, on the flat section 7e near the rear end 7j or the first member 7 the second member 8 is slidably disposed as shown in FIG. 10.

The second member 8 of the second slide member S is produced of a metal sheet and has a base portion 8a extending laterally and a longitudinal support portion 8b formed vertically to intersect the base portion 8a at right angles, forming an approximately T outside shape.

The base portion 8a has a laterally long cam groove 8c formed by punching approximately rectangular in one end and round in the other end. Also the support portion 8b has a forward end portion 8d in the lower part in the illustration and rear end portion 8e in the upper part in the illustration, and further has a couple of vertical long, rectangular mounting holes 8f and 8g formed by punching. On the left side in the illustration of the forward end portion 8d of the support portion 8b there is protrusively formed a spring retaining portion 8h having a recess.

With the two lock pins 7p, 7p inserted in the two mounting holes 7g and 7h of the first member 7 further inserted in the mounting holes 8f and 8g as shown in FIG. 3, the second member 8 of the above-described constitution is locked by an E washer (not illustrated) on the lock pins 7p, 7p and then is mounted slidably on the first member 7.

Next, the second slide member S is of such a constitution that an elastic member 9 consisting of a coil spring is mounted between the spring retaining portions 7m and 8h of the first member 7 and the second member 8, and the rear end portion 8e of the second member 8 is held in contact with the stopper 7k of the first member 7 by the elastic force of the elastic member 9.

A cam member 10 produced of a metal sheet and having teeth on the outer periphery is disposed on the underside of the base portion 8a of the second member 8 as illustrated in FIG. 3; the cam member 10 being rotatably pivoted on the bottom surface 2a of the housing 2. A drive pin 10a is attached in a position off the center of rotation of the cam member 10.

On the right side of the cam member 10 in the illustration there is disposed a two-speed gear 11 having a pinion gear 11a which meshes with the teeth on the outer periphery of the cam member 10, and a large-diameter spur gear 11b. The two-speed gear 11 is rotatably pivoted on the bottom plate 2a of the housing 2.

Above the two-speed gear 11 in the illustration, a two-speed pinion 12 is provided in mesh with the spur gear 11b of the two-speed gear 11; the two-speed pinion 12 being rotatably pivoted on the bottom plate 2a of the housing 2. The two-speed pinion 12 consists of upper and lower pinion gears of different diameters which are formed in one body. The upper pinion is a small-diameter pinion 12a in mesh with the spur gear 11b of the two-speed gear 11, while the lower pinion is a large-diameter pinion 12b which is large in external shape than the small-diameter pinion 12a.

In a motor mounting hole 2j provided above the cam member 10 in the illustration a driving force source 13 consisting of a motor is mounted. A worm gear 13a is mounted by pressing onto the rotating shaft of the driving force source 13; the worm gear 13a is designed to mesh with the large-diameter pinion 12b of the two-speed pinion 12.

Figure 11:
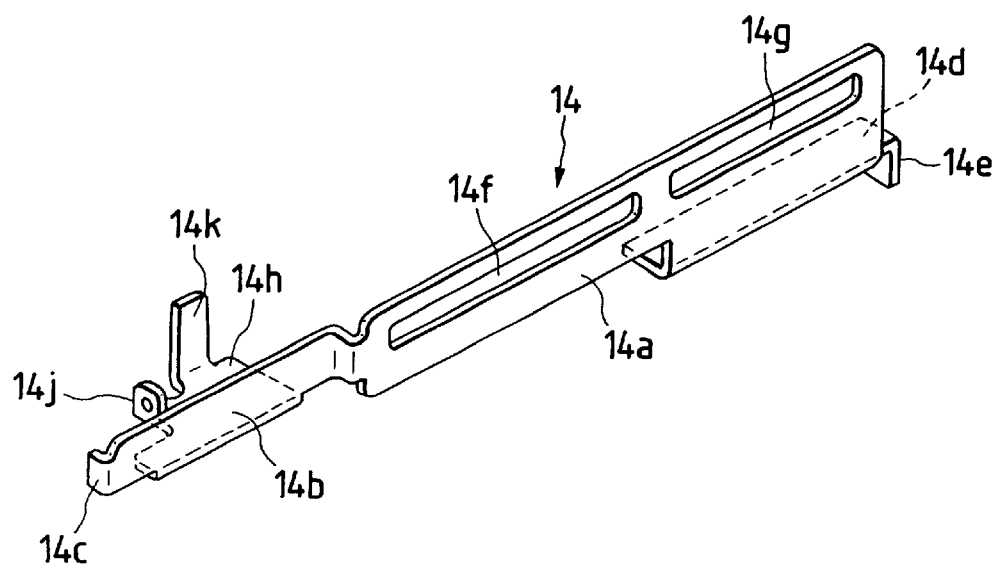
FIG. 11 is an operating member of the magnetic recording-reproducing device of the present invention.

A longitudinal operating member 14 as shown in FIG. 11 is slidably mounted on the right side plate 2b of the housing 2 shown in FIG. 3. The operating member 14 is made of a metal sheet, comprising a mounting portion 14a slidably attached on the right side plate 2b and an arm portion 14b bent in a form of step on the left in the illustration; on the arm portion 14b a forward end portion 14c is formed by bending the front end portion to the left in the illustration.

The lower part of the mounting portion 14a is bent to the left in the illustration to thereby form a level operating portion 14d. Also the rear end of the operating portion 14d is bent downwardly to form the rear end portion 14e.

Near the upper end of the mounting portion 14a two longitudinal mounting holes 14f and 14g are formed serially by punching in the mounting portion 14a.

The lower part of the arm portion 14b is bent to the left in the illustration to form a bottom plate 14h. The front end of the bottom plate 14h is bent upwardly to form a spring retaining portion 14j, in which a round hole is formed.

On the left side in the illustration opposite to the arm portion 14b, the left end portion of the bottom plate 14h is bent upwardly to form a contact portion 14k.

When the cartridge 4 is mounted on the first slide member 5, the contact portion 14k is pressed by the right end portion on the front side 4f of the cartridge 4, and accordingly the operating portion 14 also slides towards the inside of the device 1 together with the cartridge 4.

A coil spring 15 is installed in round holes formed in the spring retaining portion 14j of the operating member 14 and in the opening-closing portion 5f of the first slide member 5. The coil spring 15 pulls the operating member 14 when the first slide member 5 slides in the direction of the arrow G to eject the cartridge 4 out from the device 1, and accordingly the operating member 14 also slides to the cartridge insertion slot 1a side in the direction of the arrow G. Furthermore, on the left side in the illustration of the head mounting hole 2e of the bottom 2a of the housing 2 shown in FIG. 3, there is mounted a rotatable transport roller 18 driven by an unillustrated driving power source which is separate from the driving power source 13. The transport roller 18 is lined with a frictional member such as rubber on the perimeter, so that the pinch roller 4h will not slip when the pinch roller 4h of the cartridge 4 is pressed to rotate.

Near the two stoppers 2f of the head mounting hole 2e the magnetic head 18 is attached on an unillustrated member.

Furthermore, on the front side of the left side plate 2b of the housing 2 in the illustration a longitudinal eject button 19 is slidably mounted.

To explain the device 1 of the above-described constitution according to the present invention, first in the inside of the device 1 before the insertion of the cartridge 4, the first slide member 5 is positioned on the cartridge insertion slot 1a side as shown in FIG. 3, and the locking portions 5j, 5j consisting of a pair of locking rollers are positioned in the windows 2c, 2c of the housing 2.

To load the cartridge 4 indicated by a two-dot chain line into the device 1 in this state, the cartridge 4 is first inserted in the direction of the arrow F through the cartridge insertion slot 1a.

Then, the cartridge 4 goes into the housing 2 with its right and left guide portions 4a and 4b being guided by guide rails (not illustrated) which are disposed in the vicinity of the cartridge insertion slot 1a of both the right and left side plates 2b, 2b.

Figure 12:
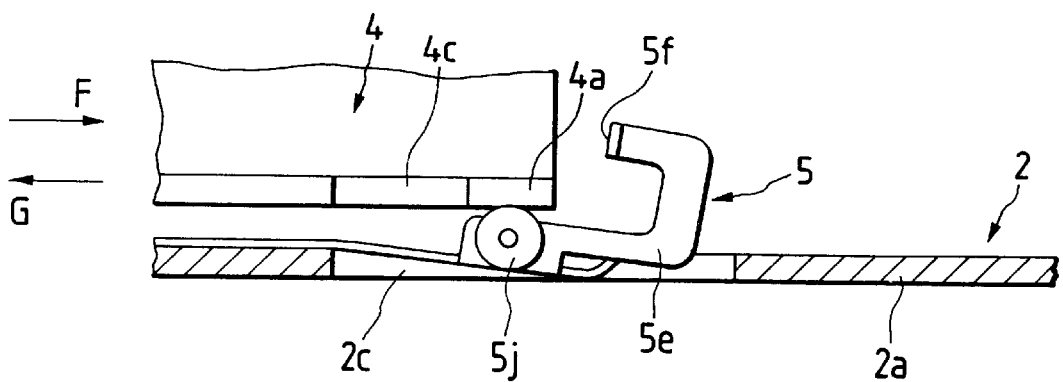
FIG. 12 is a sectional side view of a major portion for explaining the operation of the magnetic recording-reproducing device of the present invention.

Subsequently, as shown in FIG. 12, the forward end of the guide portion 4a of the cartridge 4 presses the locking portion 5j of the first slide member 5 down into the window 2c of the housing 2.

As the cartridge 4 is further pushed into the device 1 from this state, the end portion 4m of the door 4k of the cartridge 4 comes into contact with the opening-closing portion 5f of the first slide member 5, thereby opening the door 4k toward the front of the cartridge 4.

Figure 13:
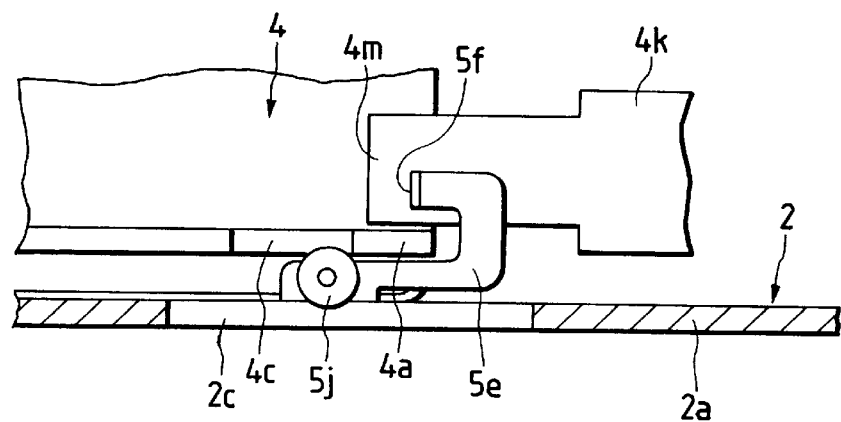
FIG. 13 is a sectional side view of a major portion for explaining the operation of the magnetic recording-reproducing device of the present invention.

As the cartridge 4 is further pushed into the device 1 simultaneously with, or after, the opening of the door 4k, the locking portion 5j that has been pushed downwardly in the window 2c of the housing 2, as shown in FIG. 13, is positioned in the engagement portion 4c in the position of the window 2c, in which the locking portion 5j elastically returns to its horizontal position to lock the engagement portion 4c of the cartridge 4.

With the elastic return of the locking portion 5j to the horizontal position, the operator can see that the cartridge 4 that has been inserted is locked with a click by the locking portion 5j of the first slide member 5.

Also the cartridge 4 is further pushed into the device 1 with an inertial force for inserting the cartridge 4 into the device 1; in this case the left end portion on the front side 4f of the cartridge 4 contacts the stopper portion 5h of the first slide member 5. The cartridge 4, therefore, can not be inserted further into the device 1.

When the cartridge 4 is mounted to the first slide member 5, the right end portion on the front side 4f of the cartridge 4 comes into contact with the contact portion 14k of the operating member 14, then moving the operating member 14 to the inside of the device 1.

Then, the operating portion 14d of the operating member 14 actuates the detecting member (not illustrated) which comprises a switch and others, to thereby operating the detecting member to ON. When the detecting member is operated to ON, the driving power source 13 which is a motor or the like starts rotating.

The rotation of the driving power source 13 is then transmitted to the two-speed gear 11 and the cam member 10 through the two-speed pinion gear 12 shown in FIG. 3, thus turning the cam member 10.

Figure 15:
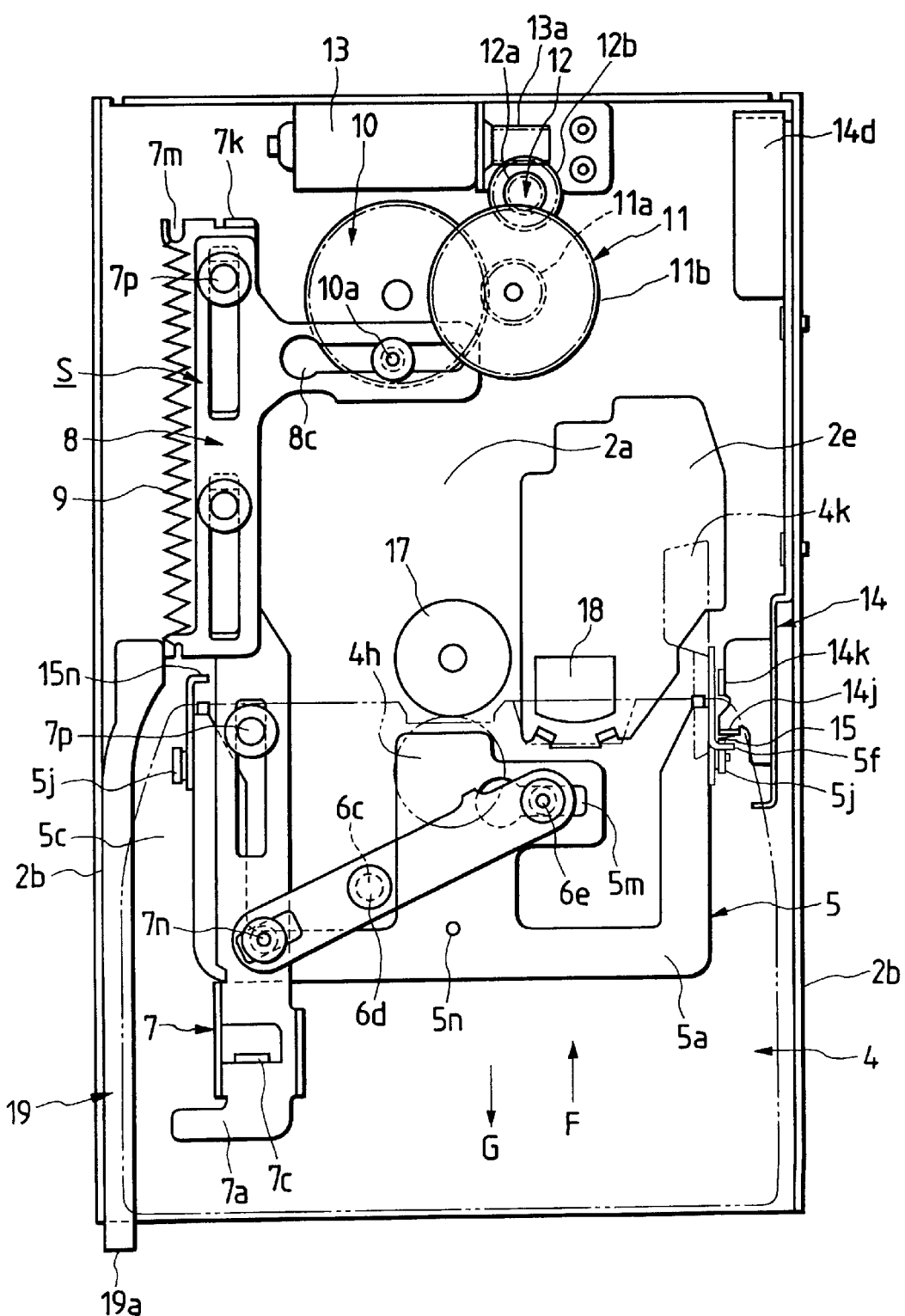
FIG. 15 is a schematic top view of a major portion for explaining the operation of the magnetic recording-reproducing device of the present invention.
Figure 16:
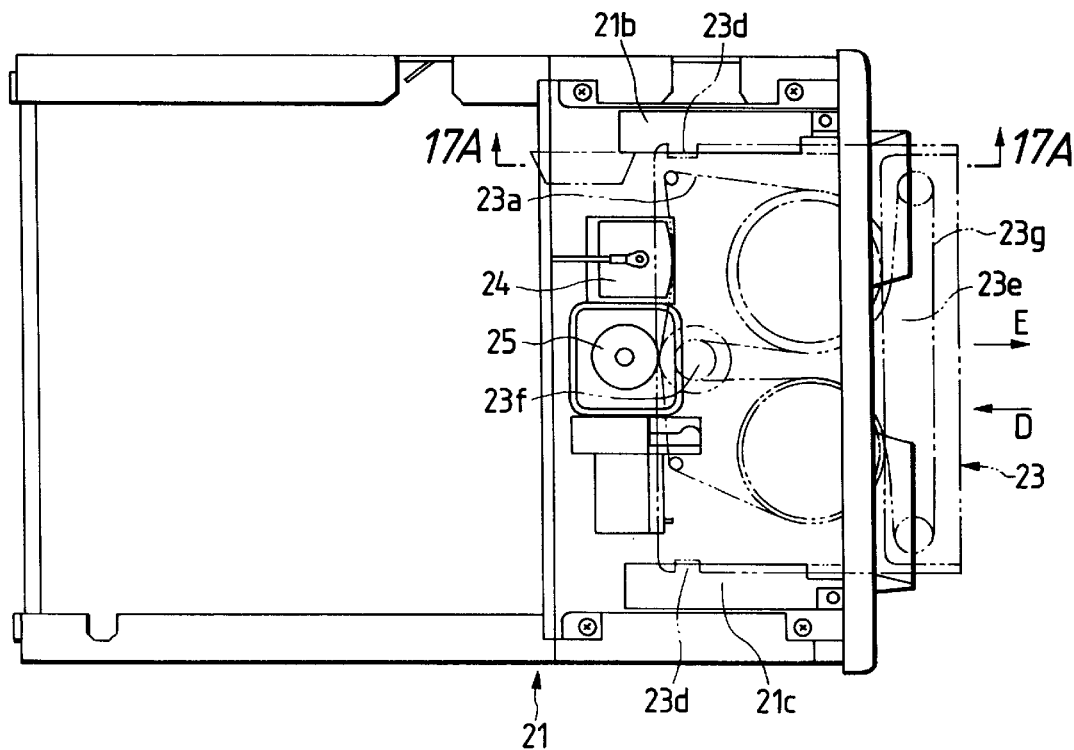
FIG. 16 is a schematic plan view of a conventional magnetic recording-reproducing device.
Figure 17A:
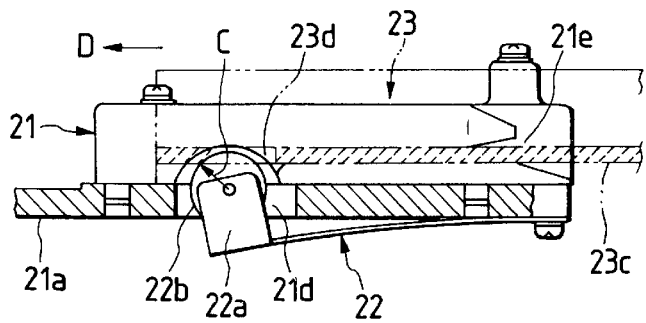
FIGS. 17A and 17B are respectively a sectional view and a side view of a major portions of the conventional magnetic recording-reproducing device.
Figure 17B:
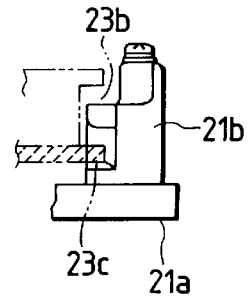

With the rotation of the cam member 10, the drive pin 10a moves within the cam groove 8c of the second member 8 of the second slide member S until the drive pin 10a comes to the lower position as shown in FIG. 15.

The second slide member S is of such a design that the first member 7 slidably mounted under the second member 8 is slid by the operation of the elastic member 9 in the same direction as the second member 8, and the other end of the link member 6 slidably pivoted on the support pin 7n of the first member 7 slides in the direction of the arrow G.

Then, the link member 6 rotates counterclockwise on the center of the support pin 6d, to slide the first slide member 5 loaded with the cartridge 4 in the direction of the arrow F which is opposite to the direction of sliding of the second slide member S.

Figure 14:
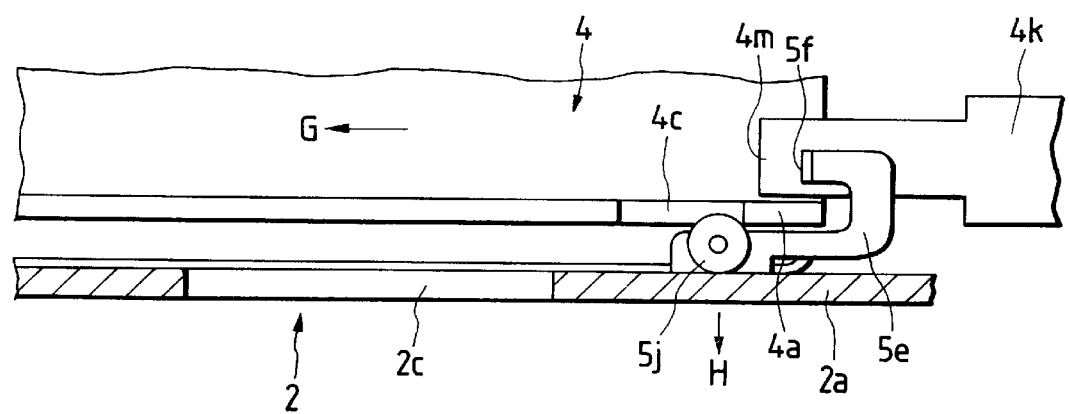
FIG. 14 is a sectional side view of a major portion for explaining the operation of the magnetic recording-reproducing device of the present invention.

With the sliding of the first slide member S in the direction of the arrow F, the locking portion 5j that is positioned in the window 2c of the bottom plate 2a slides onto the bottom plate 2a of the housing 2 as shown in FIG. 14, where the downward movement of the locking portion 5j in the direction of the arrow H is restricted; thus engagement portion 4c of the cartridge 4 can be held in the lock position by the locking portion 5j.

Therefore, because the locking portion 5j can not escape downwardly, the cartridge 4 will not come out of the device 1 if the operator attempts to take the cartridge 4 out from the device 1.

As the first slide member 5 is slid in the direction of the arrow F by the power from driving power source 13 after the locking of the cartridge 4 by the locking portion 5j as described above, the pinch roller 4h of the cartridge 4 contacts the transport roller 17. The pinch roller 4h is then pressed into contact with the transport roller 17 by the operation of the elastic member 9. Thus with the completion of loading of the cartridge 4 into the device 1, the driving power source 13 stops operating. At this time, the magnetic tape 4d slides in contact with the tape sliding surface of the magnetic head 18.

Then, an unillustrated driving power source is operated to turn the transport roller 17 according to an instruction fed from an external computer not shown, to thereby rotate the pinch roller 4h. In synchronization with the rotation of the pinch roller, the reel 4e is turned via the tape feed belt 4p, thus transporting the magnetic tape 4d, to which recording and reproducing are performed by the use of the magnetic head 18.

To eject the cartridge 4 from the device 1, the operator depresses the forward end 19a of the eject button 19 to turn on an unillustrated switch disposed in the housing 2.

Then the driving power source 13 turns to rotate the cam member 10. The drive pin 10a, therefore, moves upwardly in FIG. 3, to move the second slide member S in the direction of the arrow F. Subsequently the link member 6 rotates clockwise on the center of the support pin 6d, moving the guide pin 6e in the direction of the arrow G, causing the first slide member 5 to slide to the cartridge insertion slot 1a side.

Then, the locking portion 5j of the first slide member 5 which has been positioned on the bottom plate 2a shown in FIG. 14 is positioned in the window 2c of the bottom plate 2a of the housing 2 shown in FIG. 13 with the cartridge 4 locked, and the rear end of the cartridge 4, as shown in FIG. 3, is discharged out of the device 1, thus completing ejection of the cartridge 4.

When the cartridge 4 is pulled out from this position, the locking portion 5j is pushed, by the guide portion of the cartridge 4, into the window 2c located below, escaping downwardly to allow easy removal of the cartridge 4 out from the device 1.

That is, the device 1 of the present invention is of such a design that the locking portion 5j, when situated in the window 2c of the bottom plate 2a, moves up and down by the operation to install the cartridge 4 to, and to remove the cartridge 4 from, the first slide member 5, thereby enabling engagement and disengagement of the engagement portion 4c of the cartridge 4 by the locking portion 5j.

The device 1 of the present invention is comprised of the cartridge 4 provided with the engagement portion 4c formed and containing the magnetic tape 4d therein, the first slide member 5 having the locking portion 5j for locking the engagement portion 4c, the second slide member S connected with the first slide member 5, for sliding the first slide member 5, and the housing 2 for slidably holding the first and second slide members 5 and S separately; the engagement portion 4c of the cartridge 4 being locked by the locking portion 5j of the first slide member 5, and the cartridge 4 being slid for loading and unloading by means of the first and second slide members 5 and S.

Furthermore, in the device 1 of the present invention, the second slide member S having the two members: the first member 7 and the second member 8, has been described. The second slide member, however, may be a single member. In this case the elastic member 9 can be dispensed with.

The magnetic recording-reproducing device of the present invention is designed such that the engagement portion of the cartridge is locked by the locking portion of the first slide member and then the first and second slide members are slid to slide to load and unload the cartridge. The loading and unloading of the cartridge, therefore, can smoothly be performed. Besides since the cartridge can be properly locked, it is possible to provide a magnetic recording-reproducing device which ensures high-accuracy recording and reproduction without cartridge vibration even in the event vibration is added to the magnetic recording-reproducing device.

The housing has a bottom plate with a window section, and the locking portion of the first slide member is slidably arranged on the window and on the bottom plate. Therefore the locking portion, when disposed in the window, is moved up and down within the window by cartridge loading and unloading operation in relation to the first slide member, to thereby engage and disengage cartridge engagement portion by the locking portion. The cartridge, therefore, can smoothly be loaded to, and removed from, the first slide member with little force, so that even a physically weak person is able to load and unload the cartridge with ease.

The cartridge mounted to the first slide member is locked with the locking portion positioned in the engagement portion in the position of the window. In this state, the first slide member is slid to move the locking portion from the window onto the bottom plate, thereby restricting the downward movement of the locking portion to keep the locked state. It is, therefore, possible to provide a magnetic recording-reproducing device capable of high-accuracy recording and reproduction with cartridge movement restricted after the locking of the cartridge.

Also it is possible to provide a small-sized magnetic recording-reproducing device which has a link member for connection between the first and second slide members; the link member being connected at one end with the first slide member and at the other end with the second slide member; and also the link member being rotatably pivoted on the bottom plate of the housing between the one end and the other end of the link member, so that when the second slide member is slid, the first slide member will slide, through the link member, in the opposite direction of sliding of the second slide member. Therefore, the cartridge locked on the first slide member can be slid by the rocking motion of the link member.

Furthermore, it is possible to provide a magnetic recording-reproducing device capable of high-accuracy recording and reproduction, in which the second slide member consists of the first member and the second member, has an elastic member mounted between the first member and the second member, and is connected on at the other end of the link member with the first member. When the second member slides, the first member slides in the same direction as the second member through the elastic member, and the first slide member connected with one end of the link member slides in the opposite direction of sliding of the second member through the link member. Therefore the cartridge can be reliably pressed against the transport roller with the elastic force of the elastic member to accomplish high-accuracy recording and reproduction.

The magnetic recording-reproducing device is comprised of the transport roller rotatably pivoted on the housing, and a rotatable pinch roller in the cartridge. After the completion of mounting the cartridge, the second member of the second slide member is further slid to transmit the elastic force of the elastic member to the first slide member via the first member and the link member, to press the pinch roller against the transport roller, thereby enabling reliable transport of the magnetic tape to the transport roller by means of the pinch roller without a slip of the transport roller and the pinch roller.

Furthermore, when the cartridge is mounted to the first slide member, the door of the cartridge is opened by the opening-closing portion of the first slide member; therefore the door can be opened when the cartridge is mounted to the first slide member before sliding the first slide member. It is, therefore, possible to provide a low-power consumption magnetic recording-reproducing device, which can reduce the driving force of the driving power source for sliding the first slide member.

Simultaneously with the opening of the cartridge door, or after the opening of the door, the locking portion of the first slide member is positioned in the engagement portion of the cartridge to lock the cartridge and therefore the first slide member at which the cartridge is locked after the door has been fully opened can be slid. Therefore it is possible to provide a magnetic recording-reproducing device which can reliably operate without a malfunction and an interference of the door with the magnetic head during opening or closing operation.

What is claimed is:

1. A magnetic recording-reproducing device comprising:
   a housing having a bottom plate and a cartridge containing a magnetic tape therein to be inserted and loaded or discharged, said cartridge having a side surface formed to have an engagement portion recessed therein;
   a first slide member arranged on the bottom plate of said housing and slidable in an insertion direction and discharging direction of said cartridge while mounting said cartridge thereon, the first slide member formed of a spring metallic plate and having a locking roller fitted to said engagement portion to lock the engagement portion, the first slide member having an arm portion to rotatable hold the locking roller in a horizontal state enabling said locking roller to move on the bottom plate of said housing as the first slide member is slid; and
   a second slide member arranged in said housing to cause said first slide member to be slid in the insertion direction and discharging direction of said cartridge, said second slide member causing said first slide member to be slid in the insertion direction of said cartridge while said locking roller of said first slide member is fitted to and locked at said engagement portion,
   said bottom plate of said housing having a window, said locking roller of said first slide member slidably disposed on said window such that when said first slide member is slidably disposed on said window, an insertion end portion of said cartridge abuts against said locking roller to cause said locking roller to be fitted to the engagement portion of said cartridge and locked while said arm portion pushes down said locking roller in said window against an upward biasing force of said first slide member, said cartridge being mounted on said first slide member and said first slide member slidable in said housing up to a predetermined position,
   said cartridge mounted to said first slide member being locked when said locking roller is positioned at said engagement portion in the position of said window, and when said locking roller is positioned at said engagement portion in the position of said window and said first slide member is slid in the inserting direction of said cartridge, said locking roller is moved from said window onto said bottom plate, thereby restricting a downward movement of said locking roller by said bottom plate, and
   when said cartridge is discharged, said first slide member having said cartridge mounted thereon is slid in the discharging direction, and when said locking roller having the engagement portion of said cartridge locked therein is positioned on said window and said cartridge is pulled in the discharging direction, said insertion end portion of said cartridge causes said locking roller to be pushed down within said window while resisting against the upward biasing force of said first slide member with said arm portion and moved away from said engagement portion.

2. A magnetic recording-reproducing device according to claim 1, wherein a link member is provided for connection between said first and second slide members, and is connected at one end side with said first slide member, and at the other end side with said second slide member; said link member being rotatably pivoted on said bottom plate of said housing between said one end side and said other end side, such that when said second slide member is slid, said first slide member slides in an opposite direction of sliding of said second slide member through said link member.

3. A magnetic recording-reproducing device according to claim 2, wherein said second slide member is composed of a first member and a second member, and has an elastic member mounted between said first member and said second member; and said link member is connected at the other end side with said first member to slide said second member, said first member slides in the same direction as said second member through said elastic member; therefore said first slide member connected to one end side of said link member slides in the opposite direction of sliding of said second slide member through said link member.

4. A magnetic recording-reproducing device according to claim 3, comprising a transport roller rotatably pivoted in said housing and a rotatable pinch roller within said cartridge; after the completion of loading of said cartridge, said second member of said second slide member is further slid to transmit the elastic force of said elastic member to said first slide member via said first member and said link member, thereby pressing said pinch roller into contact with said transport roller.

5. A magnetic recording-reproducing device according to claim 1, further comprising an operating member connected to a driving source to drive the second slide member, the second slide member sliding in the inserting direction when the insertion end of the cartridge abuts against the operating member.

* * * * *